April 5, 1932.  E. GOEKE  1,852,407
HARROW ATTACHMENT FOR CULTIVATORS
Filed July 25, 1931
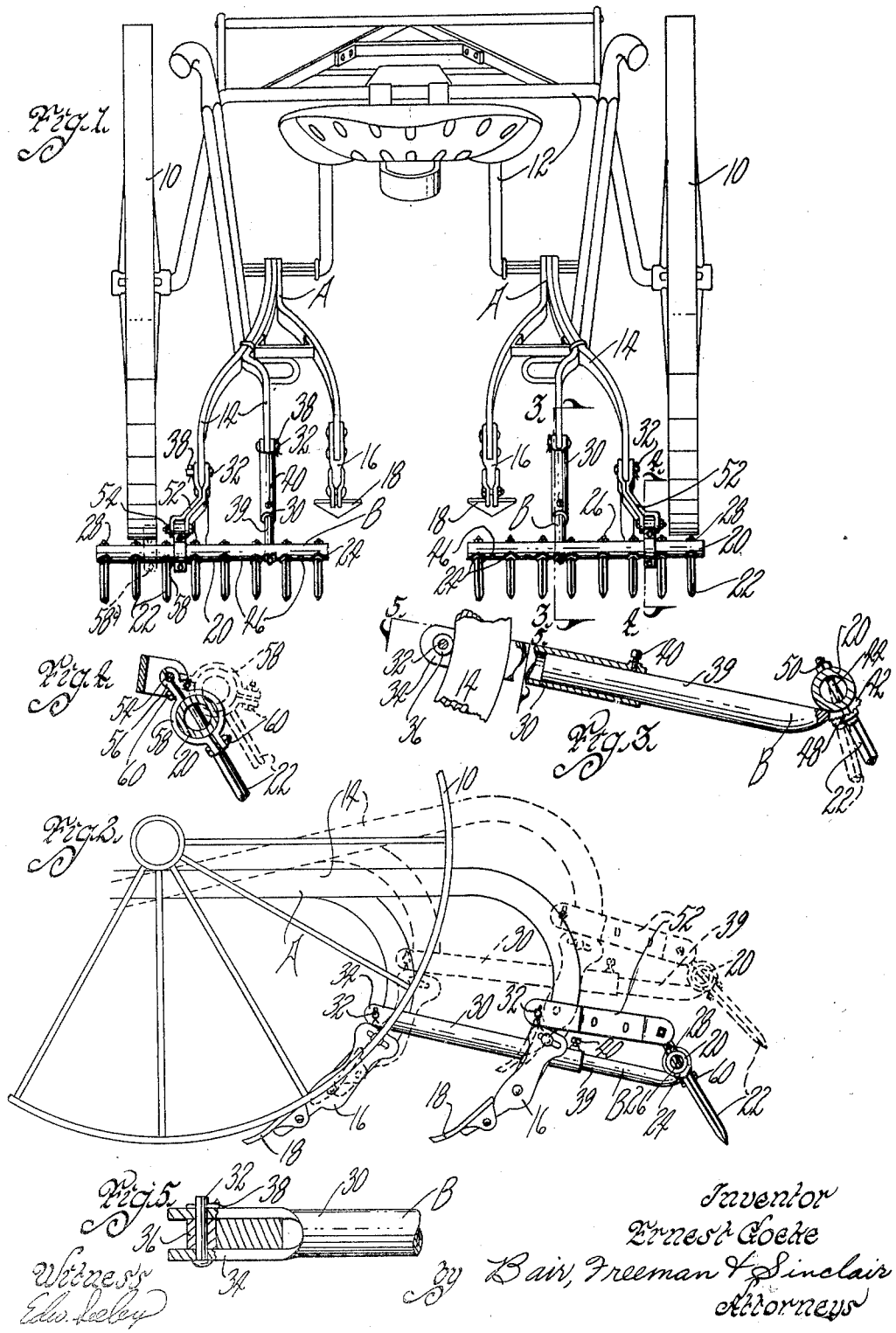
Inventor
Ernest Goeke
by Bair, Freeman & Sinclair
Attorneys
Witness
Edw. Leeley Patented Apr. 5, 1932

1,852,407

UNITED STATES PATENT OFFICE

ERNEST GOEKE, OF BAXTER, IOWA

HARROW ATTACHMENT FOR CULTIVATORS

Application filed July 25, 1931. Serial No. 553,026.

The object of my invention is to provide a harrow attachment for cultivators which is simple, durable and comparatively inexpensive to manufacture.

More particularly, it is my object to provide harrow attachments which can be connected with the beams of cultivators in such manner that they effectively break up clods of dirt left by the cultivator shovels—the same as a harrow does after original breaking of the ground and they also drag the roots of weeds out on top of the ground so as to stop their growth and in this connection are particularly desirable for exterminating morning glories, which are especially detrimental to the growth of corn and the like.

A further object is to provide a harrow attachment in the form of a toothed harrow bar, with means for attaching it to the beam of a cultivator so that when the cultivator beam is in lowered position for engaging the cultivator shovels in the ground for cultivating purposes, the toothed harrow bar is closely behind the cultivator shovels and also engaging the ground for the purpose of breaking up clods and leveling the ground, which ordinarily assumes a ridged-like contour when the cultivator shovels only are used and thus the harrow attachment effectively prevents water troughs through which the water may drain off the ground after a rain and consequently when the harrow attachment is used, the available moisture is conserved because the rain falls on even ground and easily penetrates it instead of running off.

Still another object is to provide a harrow attachment for cultivators in the form of a toothed harrow bar which is supported on the beam of a cultivator in such manner that when the beam is raised for turning around at the ends of the rows, the harrow attachment is also raised and thus automatically positioned out of the way where it does not interfere with the turning around operation and does not strike the corn during such operation.

Still another object is to provide a toothed harrow bar, with means for connecting it to the beam of a cultivator comprising a pair of connector bars having limited pivotal connection with the cultivator beam and one having a rigid and the other a pivotal connection with the toothed harrow bar.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a rear perspective view of a cultivator showing a pair of cultivator beams with one of my attachments applied to each beam.

Figure 2 is a partial side elevation of the cultivator and attachment.

Figure 3 is an enlarged sectional view on the line 3—3 of Figure 1 showing one of the connector bars.

Figure 4 is an enlarged sectional view on the line 4—4 of Figure 1 showing the connection of the other connector bar with the toothed harrow bar; and Figure 5 is a sectional view on the line 5—5 of Figure 3.

On the accompanying drawings, I have used the reference numeral 10 to indicate the wheels of a cultivator. Cultivator beams A extend rearwardly from the frame 12 of the cultivator and each terminates in a plurality of three beam elements 14. The beam elements 14 have shovel shanks 16 on their lower ends with which the cultivator shovels 18 are connected. The foregoing description is of an ordinary single row cultivator to which my harrow attachment may be applied, but it is to be understood that the attachment can be applied to double row cultivators and cultivators having a different arrangement of shovels, the attachment being universally adjustable for connection with various types of cultivators and to cultivators having different sizes and arrangements of parts.

It will be noted that two of the harrow attachments, which I will designate as B, are provided, one for each cultivator beam A. Since they are identical except as to the arrangement of parts being reversed, I will describe but one of them.

The harrow attachment B consists of a round harrow bar 20 having harrow teeth 22 and connector bars for supporting the toothed harrow bar 20 on the cultivator beam A. The harrow teeth 22 may be of ordinary construction, each having an enlargement 24 engaging against the harrow bar 20, a shank 26 extending through the harrow bar and a nut 28 for holding the tooth in position.

I provide an extensible connector bar comprising a tubular member 30 forked at its forward end and having a removable pin 32 through the fingers 34 of such forked end. A roller 36 is mounted on the pin 32. The pin 32 may be retained in position by a cotter pin 38.

From an inspection of Figures 3 and 5 it will be obvious that the fingers 34 are arranged on opposite sides of the beam element 14 and the roller 36 is in front of the beam element. This provides for limited pivotal movement of the member 30 relative to the beam element 14, while the roller 36 is provided to prevent excessive wear on the pin 32.

The extensible connector bar also includes a round bar member 39 telescopically associated with the tubular member 30 and retained in any adjusted position relative thereto by a set screw 40.

The rear end of the bar 39 is flattened and curved to partially encircle the round harrow bar 20 and is forked or provided with a slot 42. A clamping bolt 44 extends through the harrow bar 20 and may be adjustably positioned in either one of three openings 46 provided therein. The clamping bolt 44 has a serrated washer 48 engaging the rear forked end of the bar 39. The bolt extends through the slot 42 and is provided with a nut 50, as shown in Figure 3. By this arrangement, the harrow bar is rotatably adjustable relative to the extensible connector bar 30, 39.

I also provide a connector bar 52 which has forked forward and rearward ends, the forward end being associated with one of the beam elements 14 in the same manner as the forward forked end of the bar 30 and as shown in Figure 5. The rearward forked end of the connector bar 52 is provided with a pivot pin 54 extending through the eye 56 of a clamp member 58. Bolts 60 serve to clamp the member 58 in any rotatable adjustable position relative the harrow bar 20. The clamp member 58 may be adjusted to different positions, as shown, for instance, in dotted lines at 58a in Figure 1. It will be noted that the right hand harrow attachment in Figure 1 is adjusted to a different position than the left hand harrow attachment in order to illustrate how the attachments may be adjusted as desired or required.

In Figure 2, I have shown the harrow attachment in normal position by full lines and in raised position by dotted lines. It will be noted that because of the possible limited swinging movement of the connector bar 52 with its beam element 14, the connector bar first assumes a position inclined from its normal position, as shown in full lines and then serves to support and lift the harrow bar 20. The connector bar 52 is the main lifting connection, while the bar 39 being rigidly connected with the harrow bar serves to help somewhat in the lifting and prevent dropping of the inner end of the harrow bar to an inclined or twisted position, as would be the case if the connection at 54 were pivoted. It will thus be obvious that there is a real purpose in pivoting the connection with the eye 56 (so that the harrow teeth can work up and down to follow the ground contour, the pivotal connections with the beam elements 14 also permitting this) and the rigid connection at 54. The rigid connection also maintains the harrow teeth in the desired angular relation to the ground surface.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a harrow attachment for cultivators, a round toothed harrow bar, and means for supporting said toothed harrow bar on the beam of a cultivator, said means comprising an extensible connector bar having a curved and slotted rear end partially encircling said round toothed harrow bar, a clamping bolt through said toothed harrow bar and through the slot of said slotted end, said extensible connector bar having a forked forward end receiving a beam element of said cultivator beam, a removable pin through the fingers of said forked end, a roller on said pin, an encircling clamp around said toothed harrow bar spaced from said clamping bolt, an eye thereon, a connector bar having forked ends, one receiving said eye and the other receiving a second beam element of said cultivator beam, a pin through one of said forked ends and through said eye, and a removable pin through the other forked end having a roller thereon.

2. In a harrow attachment for cultivators, a round toothed harrow bar, and means for supporting said toothed harrow bar on the beam of a cultivator, said means comprising an extensible connector bar having a curved and slotted rear end partially encircling said round toothed harrow bar, a clamping bolt through said toothed harrow bar and through the slot of said slotted end, a serrated washer on said clamping bolt and against said curved rear end of said extensible connector bar, said extensible connector bar having a forked forward end receiving a beam element of said cultivator beam, a removable pin through the fingers of said forked end, a roller on said pin, an encircling clamp around said toothed harrow bar spaced from said clamping bolt, an eye thereon, a connector bar having forked ends, one receiving said eye and the other receiving a second beam element of said cultivator beam, a pin through one of said forked ends and through said eye, and a removable pin through the other forked end having a roller thereon.

3. In a harrow attachment for cultivators, a round toothed harrow bar, and means for supporting the same on the beam of a cultivator, said means comprising connector bars connected with a pair of beam elements of said cultivator beam for limited pivotal movement relative thereto, one of said connector bars being rigidly connected with said toothed harrow bar, and a clamping bolt for providing such connection, said connector bar having a curved portion partly encircling said round toothed harrow bar, said clamping bolt extending through such portion and through the harrow bar, the other connector bar being pivotally connected to the toothed harrow bar.

4. In a harrow attachment for cultivators, a round toothed harrow bar, and means for supporting the same on the beam of a cultivator, said means comprising connector bars connected with a pair of beam elements of said cultivator beam for limited pivotal movement relative thereto, one of said connector bars being rigidly connected with said toothed harrow bar, and a clamping bolt for providing such connection, said connector bar having a curved portion partly encircling said round toothed harrow bar, said clamping bolt extending through such portion and through the harrow bar, such portion having a slot for said clamping bolt to extend through, the other connector bar being pivotally connected to the toothed harrow bar.

5. In a harrow attachment for cultivators, a toothed harrow bar, and means for supporting said harrow bar on the beam of a cultivator, said means comprising a pair of connector bars connected each with a beam element of said cultivator beam, one of said connector bars being pivoted relative to its beam element and rigidly connected with said toothed harrow bar, the other connector bar being pivotally connected with its beam element for limited pivotal movement relative thereto and pivotally connected with said toothed harrow bar.

6. In a harrow attachment for cultivators, a toothed harrow bar, and means for supporting said harrow bar on the beam of a cultivator, said means comprising a pair of connector bars connected each with a beam element of said cultivator beam, one of said connector bars being pivoted relative to its beam element, the other connector bar being pivotally connected with its beam element for limited pivotal movement relative thereto, both bars being connected with said toothed harrow bar, one of said last connections being rigid and rotatably adjustable relative to the harrow bar and the other one being pivoted and likewise adjustable.

Des Moines, Iowa, July 17th, 1931.

ERNEST GOEKE.